J. L. Rohrer.
Harvester-Rake.
N° 84138
Patented Nov. 17, 1868.

Witnesses: Wm. A. Steel, John Parker

J. L. Rohrer
by his Attorney
Henry Howson.

UNITED STATES PATENT OFFICE.

JOHN L. ROHRER, OF UPPER LEACOCK, PENNSYLVANIA.

IMPROVEMENT IN HARVESTER-REELS.

Specification forming part of Letters Patent No. 84,138, dated November 17, 1868.

*To all whom it may concern:*

Be it known that I, JOHN L. ROHRER, of Upper Leacock, Lancaster county, Pennsylvania, have invented certain Improvements in Harvesting-Machines; and I do hereby declare the following to be a full, clear, and exact description of the same.

My invention consists of rakes so arranged for adjustment on the blades or beaters of a harvesting-machine that their teeth may be withdrawn behind the edges of the blades after the latter have passed above the cutter-bar, the prompt discharge of the grain from the rakes and to the platform being thus insured.

In order to enable others skilled in the art to make and use my invention, I will now proceed to describe its construction and operation, reference being had to the accompanying drawing, which forms a part of this specification, and in which—

Figure 1:
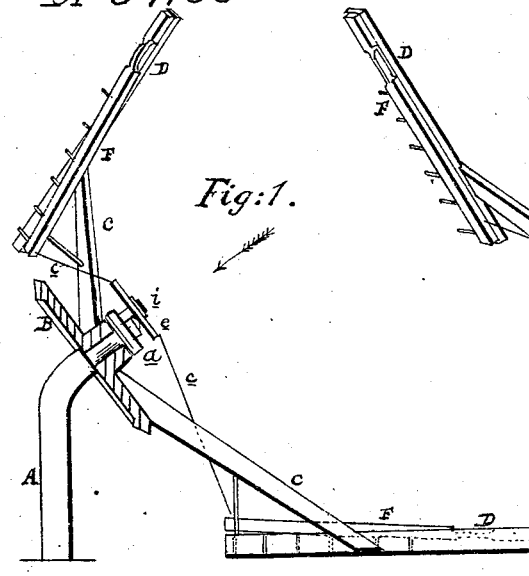
Figure 2:
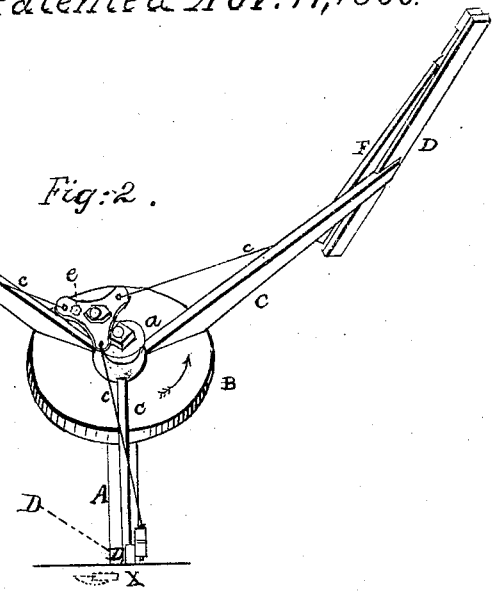
Figure 3:
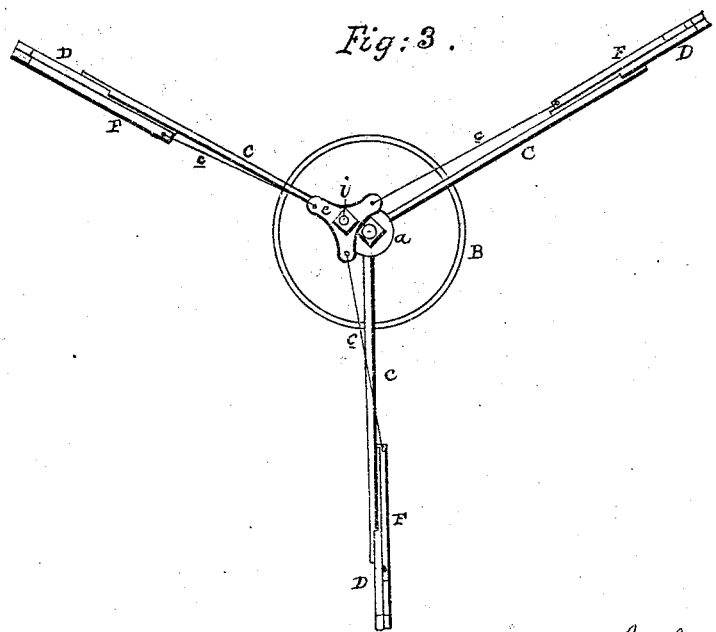

Figure 1 is a sectional elevation of sufficient of a harvesting-machine to show my improvement. Fig. 2 is a front elevation; and Fig. 3, a face view, looking in the direction of the arrow, Fig. 1.

A is a vertical bar or standard, which is secured to the frame of a harvesting-machine, and which is bent at the upper end toward the side of the machine from which the cutter-bar X, Fig. 2, extends.

On the upper inclined end of the standard A turns a disk, B, from which project at an angle, as shown in the drawing, three arms, C C C, and to the outer end of each of the latter is secured a blade or beater, D.

The beaters are so arranged on the arms C, and at such an angle, that, as the disk B revolves in the direction of its arrow, Fig. 2, each blade will be carried over the cutter-bar parallel to and nearly in contact with the same.

At the side of each blade is a rake-bar, F, which is secured to the blade near its outer end only, and is reduced in thickness near this end, so that it can be bent back a short distance from the outer edge of the blade, and thus withdraw its teeth from beyond the said edge, the bar, owing to the elasticity of the reduced portion, resuming a position parallel to the edge of the blade when all pressure is removed.

To the upper end of the standard A, which projects beyond the hub of the disk B, is secured an adjustable plate, $a$, and near one side of the latter is a pin, $i$, which is eccentric to the axis of the disk B, on which turns a triangular plate, $e$.

To each arm of the plate $e$ is connected a cord or wire, $c$, the opposite end of which is secured to the inner end of one of the rakes.

Owing to the eccentricity of the pin $i$ and the axis of the disk B, the rakes and blades during their revolution will be carried in a circle, the center of which does not coincide with the pin $i$. The wires $c$, which are secured to the said pin through the medium of the plate $e$, will therefore be slack during a portion of a revolution, and will then become taut, drawing back the rakes to which they are attached.

The pin $i$ is so arranged, by adjusting the plate $a$, that the rakes shall be drawn back immediately after they have passed over the cutter-bar, the grain held by the rake falling onto the platform as the teeth of the rake are withdrawn behind the edge of the blade or beater.

It will be seen that by the means above described the rakes are prevented from retaining the grain any longer than is absolutely necessary to convey it to the cutters, and that by adjusting the pin $i$ the discharge of the grain may be effected at any desired point of the revolution of the rake.

Instead of reducing the rake-bar in thickness, in order to render it elastic, as described, it may be jointed by a bolt to the outer end of the blade, a spring bearing on the bar, so as to move it outward as the cord $c$ is slackened. Other devices may also be employed for withdrawing the rake behind the blade.

Without, therefore, confining myself to the precise construction and arrangement of parts shown and described,

I claim as my invention and desire to secure by Letters Patent—

1. A rake, F, arranged upon the beater of a harvesting-machine, and adjustable thereon, so that its teeth may be projected beyond or withdrawn from the edge of the beater, substantially as and for the purpose described.

2. The revolving beaters or blades D and their adjustable rakes F, in combination with a pin, $i$, arranged eccentric to the axis round which the blades revolve, and connected to the rakes, substantially as and for the purpose specified.

In testimony whereof I have signed my name to this specification in the presence of two subscribing witnesses.

JOHN L. ROHRER.

Witnesses:
  WM. B. WILEY,
  JAMES BRADY.